Oct. 13, 1942.                A. E. ANDERSON                2,298,817
           AUTOMATIC RECLOSING CIRCUIT BREAKER SYSTEMS
                       Filed June 26, 1941
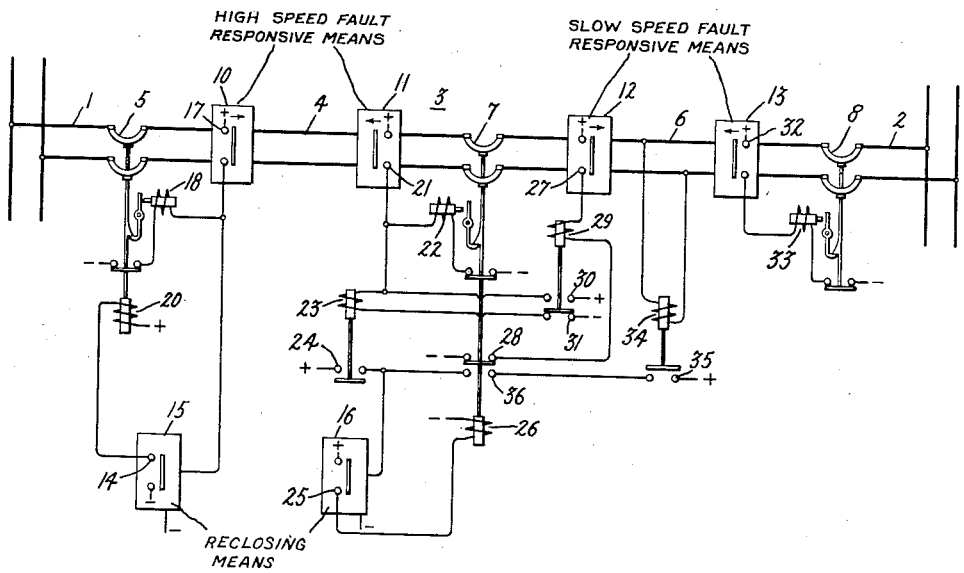
Inventor:
Arvid E. Anderson,
by Harry E. Dunham
His Attorney.

Patented Oct. 13, 1942

2,298,817

UNITED STATES PATENT OFFICE 2,298,817

AUTOMATIC RECLOSING CIRCUIT BREAKER SYSTEM

Arvid E. Anderson, Media, Pa., assignor to General Electric Company, a corporation of New York Application June 26, 1941, Serial No. 399,805

6 Claims. (Cl. 175—294)

My invention relates to automatic reclosing circuit breaker systems and particularly to a system for controlling the reclosing of a circuit breaker which interconnects adjacent sections of a tie line between two alternating current systems.

In such tie lines, adjacent sections are sometimes provided with different types of protective apparatus. For example, one section may be provided with sufficiently high speed fault responsive means to isolate the faulty section and clear the fault before too great an angular separation occurs between the two systems. Under such conditions, it is desirable to reconnect the section into service as quickly as possible in order to maintain the two systems in step. Another section, however, may be provided with such slow operating fault responsive means that, by the time the faulty section has been isolated and the fault has been cleared, the two systems have fallen out of step. Under such conditions, it is desirable not to reestablish the connection between the two systems through the tie line until the two systems are in synchronism.

One object of my invention is to provide an arrangement for controlling the reclosing of a circuit breaker interconnecting two adjacent sections of a tie line between two alternating current systems, which sections are respectively provided with protective relaying equipments having different speeds of operation, so that the two adjacent sections are reconnected together as quickly as it is practical to do so.

My invention will be better understood from the following description when taken in connection with the accompanying drawing, the single figure of which diagrammatically illustrates an automatic reclosing circuit breaker system embodying my invention, and its scope will be pointed out in the appended claims.

Referring to the accompanying drawing, 1 and 2 respectively represent different alternating current systems which are normally connected together by a tie line 3 comprising a section 4 one end of which is connected to the system 1 by a suitable circuit breaker 5 and the other end of which is connected to one end of a section 6 by a suitable circuit breaker 7, the other end of the section 6 being connected to the system 2 by a suitable circuit breaker 8. The two series-connected sections 4 and 6 are respectively equipped with suitable protective relaying apparatus for selectively effecting the opening of the circuit breakers at the ends thereof in response to a fault thereon so that only the faulty section is cut out of service without interrupting the supply of current to the other section since, in practice, each section may be connected to supply current to load circuits not shown. In the particular embodiment of my invention shown in the drawing, it will be assumed that the section 4 is provided with suitable high speed fault responsive means 10 and 11 for respectively effecting the opening of the circuit breakers 5 and 7 in response to a fault on the section 4 and that the section 6 is provided with suitable relatively slow speed fault responsive means 12 and 13 for respectively effecting the opening of the circuit breakers 7 and 8 in response to faults on the section 6. Since the details of such fault responsive means are well known to those skilled in the art and do not form any part of my present invention, I have represented each of these fault responsive means by a rectangle containing a set of contacts, in order to simplify the present disclosure. These sets of contacts are respectively closed only whenever a fault occurs on the associated sections. The circuit breakers 5 and 7 are also provided with suitable automatic reclosing means 15 and 16 of any suitable type, examples of which are well known in the art, whereby the associated circuit breakers are reclosed as quickly as possible after the operation of the reclosing means has been initiated. Since the details of such instantaneous reclosing means are well known to those skilled in the art and do not form a part of my present invention, I have also shown each of these reclosing means by a rectangle containing a set of contacts in order to simplify the disclosure. These sets of contacts are respectively closed immediately after the operation of the associated reclosing means is initiated. For the purpose of this description, it is assumed that the circuit breaker 8 is manually reclosed after the fault responsive means 13 has effected the opening thereof in response to a fault on the section 6.

Since the fault responsive means 10 and 11 are assumed to be very fast operating devices and to be capable of removing a fault on the section 4 before the two systems 1 and 2 fall out of step, it is desirable to control the reclosing of the circuit breakers 5 and 7 in such a manner that they are reclosed as quickly as possible after they have been opened in response to a fault on the section 4. In the particular arrangement shown, the closing of the contacts 17 of the fault responsive means 10 completes a circuit for the trip coil 18 of the circuit breaker 5 and also completes the initiating circuit for the reclosing means 15. By closing its contacts 14 the reclosing means 15 completes an energizing circuit for the closing coil 20 of the circuit breaker 5 to effect the immediate reclosing thereof. Similarly the closing of the contacts 21 of the fault responsive means 11 completes an energizing circuit for the trip coil 22 of the circuit breaker 7 and also an energizing circuit for a control relay 23 which in turn by closing its contacts 24 completes the initiating circuit of the reclosing means 16. By closing its contacts 25, the reclosing means 16 completes an energizing circuit for the closing coil 26 of the circuit breaker 7 to effect the immediate reclosing thereof.

Since the fault responsive means 12 and 13 are assumed to be relatively slow in responding to faults on the section 6, it is evident that the two systems 1 and 2 may fall out of synchronism before the fault is cleared. Therefore, after the circuit breaker 7 has been opened in response to the operation of the fault responsive means 12, it is not desirable to reclose the circuit breaker 7 and restore service to the section 6, until the section 6 has also been disconnected from the system 2 by the opening of the circuit breaker 8, thereby insuring that the reclosure of the circuit breaker 7 does not reconnect the two systems 1 and 2 when they are out of synchronism. In accordance with my invention, I provide an arrangement whereby the circuit breaker 7, after being opened in response to a fault on the section 6, cannot be reclosed until the voltage across the section 6 has decreased below a predetermined value thereby indicating that the circuit breaker 8 is open and the section 6 is not energized from the system 2. In the particular arrangement shown in the drawing, this result is accomplished by having the contacts 27 of the fault responsive means 12 complete through auxiliary contacts 28 on the circuit breaker 7, an energizing circuit for a control relay 29 which in turn, by closing its contacts 30, completes an energizing circuit for the trip coil 22 of the circuit breaker 7 and, by opening its contacts 31, interrupts the circuit of the control relay 23 which is normally connected in parallel with the trip coil 22 of the circuit breaker 7 when it is closed. Therefore, the relay 23 is not energized to initiate the immediate operation of the reclosing means 16 when the circuit breaker 7 is opened in response to the operation of the fault responsive means 12. As soon, however, as the fault responsive means 13 at the other end of the section 6 has closed its contacts 32 and thereby completed an energizing circuit for the trip coil 33 of the circuit breaker 8 to effect the opening of this circuit breaker so that the section 6 is isolated from both systems, a voltage relay 34, which is connected across the section 6, closes its contacts 35 and completes through auxiliary contacts 36 of the circuit breaker 7, an initiating circuit for the reclosing means 16. In this manner the circuit breaker 7 is not reclosed after being opened in response to a fault on the section 6 until the voltage across the section 6 has decreased below a predetermined value.

From the above description, it will be observed that, when a fault occurs on the section 4, which is equipped with the high speed fault responsive means, the circuit breaker 7 is opened and reclosed as quickly as possible in order to maintain the two systems in synchronism. When, however, a fault occurs on the section 6, which is equipped with the relatively slow speed fault responsive means, the circuit breaker 7 is opened as quickly as the relaying equipment can operate, but the circuit breaker 7 is not automatically reclosed to restore service to the section 6 until after the voltage thereof has decreased below a predetermined value, thereby indicating that the circuit breaker 8 at the other end of the section is open so that the reclosure of the circuit breaker 7 will not reconnect the two systems 1 and 2.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In combination, two electric circuits, a circuit breaker interconnecting said circuits, means responsive to a fault on one of said circuits for opening and quickly reclosing said circuit breaker, means responsive to a fault on the other of said circuits for opening said circuit breaker, and means for reclosing said circuit breaker only in response to a predetermined electric condition of said other circuit when said circuit breaker is opened by said last-mentioned fault responsive means.

2. In combination, two electric circuits, a circuit breaker interconnecting said circuits, means responsive to a fault on one of said circuits for opening and quickly reclosing said circuit breaker irrespective of the voltage condition of the other circuit, means responsive to a fault on said other of said circuits for opening said circuit breaker, and means for reclosing said circuit breaker only in response to a predetermined voltage condition of said other circuit when said circuit breaker is opened by said last-mentioned fault responsive means.

3. In combination, two electric circuits, a circuit breaker interconnecting said circuit, means responsive to a fault on one of said circuits for opening and quickly reclosing said circuit breaker irrespective of the voltage condition of the other circuit, means responsive to a fault on said other of said circuits for opening said circuit breaker, and means for reclosing said circuit breaker only when the voltage of said other circuit is below a predetermined value when said circuit breaker is opened by said last-mentioned fault responsive means.

4. In combination, two electric systems, a tie line interconnecting said systems and comprising a circuit breaker connecting two adjacent sections, means including high speed relaying means responsive to a fault on one of said sections for effecting the opening and the quick reclosing of said circuit breaker, relatively slow speed relaying means responsive to a fault on the other of said sections for opening said circuit breaker, and means controlled by the voltage of said other section for reclosing said circuit breaker only when said voltage is below a predetermined value.

5. In combination, two alternating current electric systems, a tie line interconnecting said systems and comprising a circuit breaker interconnecting two adjacent sections, means responsive to a fault on a predetermined one of said sections for opening and reclosing said circuit breaker before said systems can fall out of step, means responsive to a fault on the other of said sections for opening said circuit, and means dependent upon a predetermined electric condition of said other of said sections for controlling the reclosing of said circuit breaker when it is opened by said last-mentioned fault responsive means.

6. In combination, two alternating current electric systems, a tie line interconnecting said systems and comprising a circuit breaker interconnecting two adjacent sections, means responsive to a fault on a predetermined one of said sections for opening and reclosing said circuit breaker before said systems can fall out of step, means responsive to a fault on the other of said sections for opening said circuit, and means for reclosing said circuit breaker only after the voltage across said other of said sections has decreased below a predetermined value when said circuit breaker is opened by said last-mentioned fault responsive means.

ARVID E. ANDERSON.